June 6, 1961   K. L. PECK ET AL   2,987,341
RELEASABLE HOOK

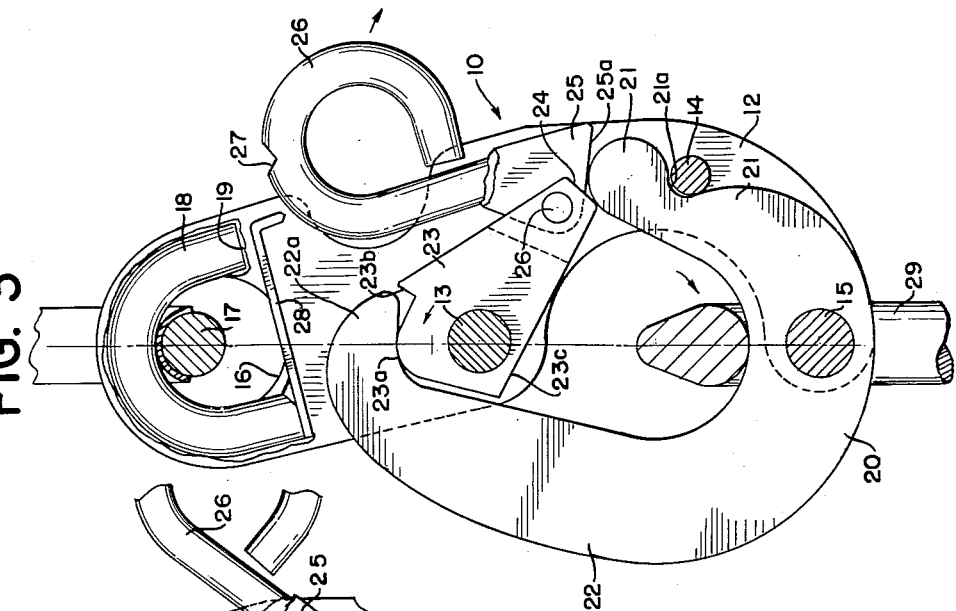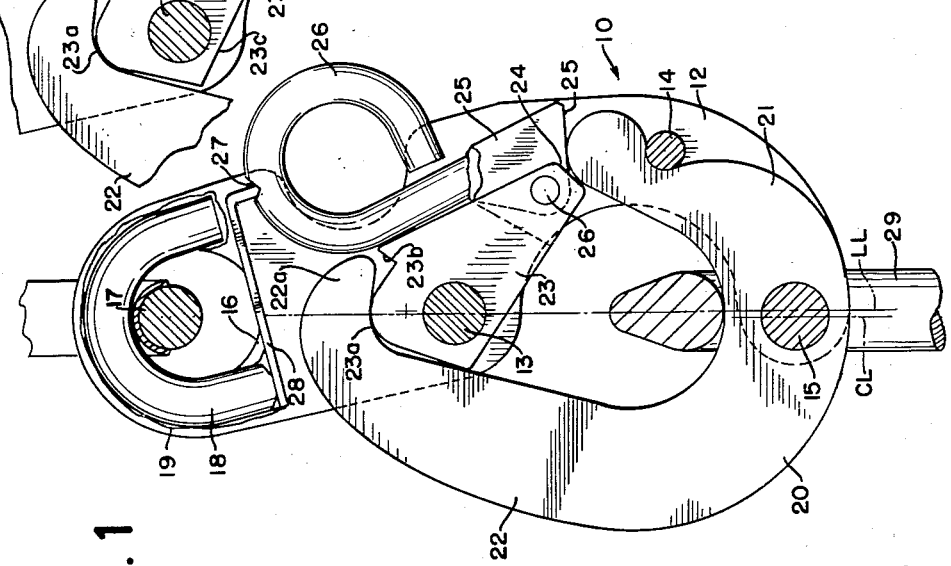

Filed Oct. 28, 1959   2 Sheets-Sheet 2

INVENTORS
Kenneth L. Peck
John M. DiMartino
BY Pennie Edmonds Morton Barrows Taylor
ATTORNEYS United States Patent Office 2,987,341
Patented June 6, 1961

2,987,341
RELEASABLE HOOK
Kenneth L. Peck and John M. Di Martino, Sayville, N.Y., assignors to Peck & Hale, Inc., Sayville, N.Y., a corporation of New York
Filed Oct. 28, 1959, Ser. No. 849,412
6 Claims. (Cl. 294—83)

This invention relates to releasable hooks used, for example, as a connecting device for securing an attaching member or fitting, such as the link of a sling, to the end of a hoisting cable. More particularly, the invention is concerned with a novel releasable hook which is of rugged compact construction and of large capacity in relation to its weight. In the new hook, the girth of the part which passes through the fitting is smaller than in prior hooks and, as a result, the hook may be used with fittings of a wide range of sizes. The new hook is so constructed that, when it is under load, the load tends to maintain it closed and means are provided to prevent accidental release following a shift of the load. Release of the hook is relatively easy and the maximum load at which the hook can be released, can be varied within substantial limits by simple modifications in the hook. The hook can thus be constructed to prevent the release of loads which are within the capacity of the hook but may not be safely released.

For a better understanding of the invention, reference may be made to the accompanying drawings in which FIG. 1 is a front elevational view of the new hook in closed condition with one of the frame plates removed;

FIG. 2 is a fragmentary view similar to FIG. 1 but showing the parts during release under relative light load;

FIG. 3 is a view similar to FIG. 1 showing the parts during release under heavy load;

Figure 5:
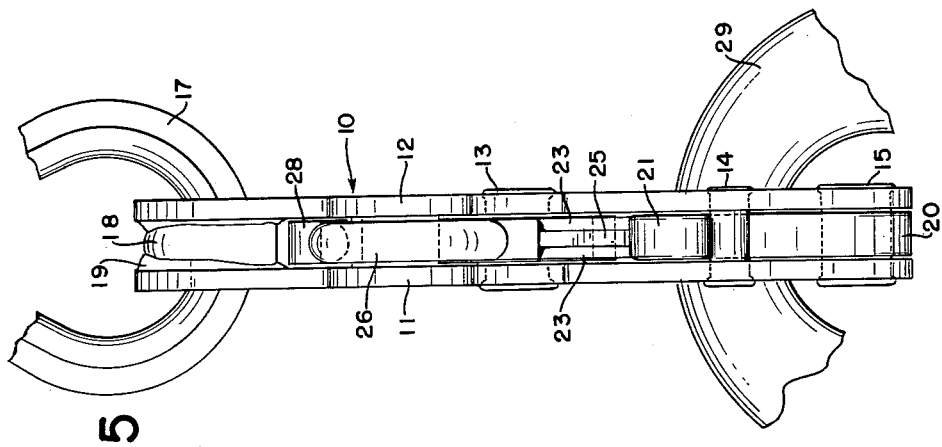
FIG. 5 is a side view of the hook.

The new hook comprises a frame 10 formed of a pair of side plates 11, 12 which are secured together in spaced relation by rivets 13, 14, and 15. At their upper ends, the plates are formed with openings 16 by means of which the hook can be mounted in an eye 17 on the end of a hoisting cable and, above the openings, the plates are separated by a U-shaped spacer 18 which may be of round stock and is held in place by being welded to the plates as indicated at 19.

A generally U-shaped hook member 20 is pivotally mounted between the plates on the rivet 15 in such fashion that the section 21 of the member at one side of the pivot is shorter than the section 22 at the other side of the pivot. The section 21 is provided with a recess 21a in its outer edge near its end and, when the member is swung on the pivot 15 to closed position, the short section 21 of the member rests upon the rivet 14 with the latter entering the recess and serving as an abutment. The long section 22 has a lateral extension 22a at its end for a purpose to be described.

A cam 23 is pivotally mounted between the plates on the rivet 13 and the cam has a curved cam surface 23a, at one end of which the cam is formed with a shoulder 23b facing toward the surface. The cam is provided with a tail 24 which is slotted in the plane of the cam, and a plate 25 is mounted in the slot on a pivot 26. The plate 25 is attached to one end of a loop 26 of round stock and the plate and loop form a handle, by which the hook can be released. The loop is formed with a slot 27 adapted to receive the end of a spring latch 28 attached to one end of the spacer 18.

Figure 4:
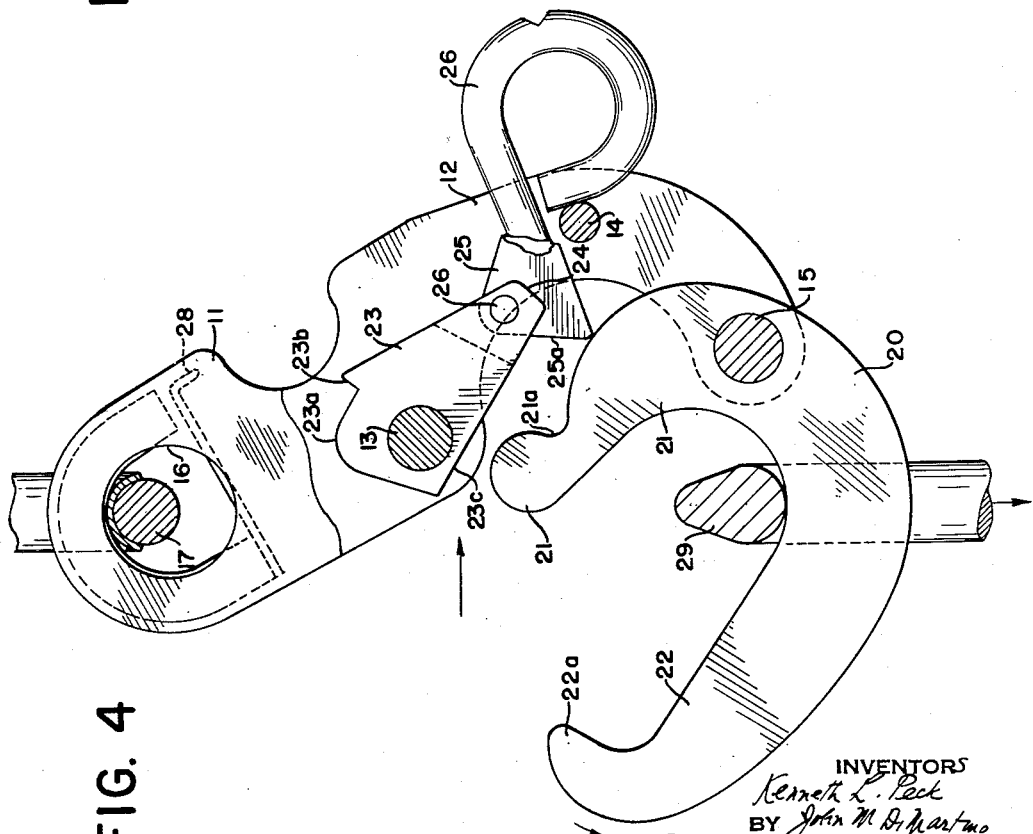
FIG. 4 is a view similar to FIG. 1 showing the parts with the release action nearly completed.

When the hook is open, both ends of the hook member point away from the frame and the loop 26 of the handle rests against the abutment 14, as shown in FIG. 4. In this position of the loop, the cam 23 lies in such relation to the handle that the cam and handle define a wide angle above them. When the hook is to be engaged with an attaching member, such as a sling link 29, the long section 22 of the hook member is passed through the link and the hook is then closed by swinging the member on its pivot 15 in a clockwise direction as shown in the drawings. As the hook member is swung upward, the end of the short section 21 of the member engages the straight lower side 23c of the cam 23 and moves along it, swinging the cam toward the horizontal. As the movement of the hook member continues, the lateral extension 22a of the long section 22 of the member passes over the top of the curved surface 23a of the cam and the end of the extension engages the shoulder 23b. At about the same time, the end of the short section 21 of the member has moved off the side 23c of the cam and it then engages the opposed surface of the plate 25 of the handle and starts to swing the handle counter-clockwise on its pivot 26. Further movement of the hook member causes a relative movement of the cam and handle to reduce the angle defined between their upper sides and, ultimately, the short section of the hook member engages the abutment 14. The hook is now closed and it can be locked in such position by swinging the handle upwardly to cause the loop to pass under the end of the spring latch 28 until the end of the latch enters the recess 27 in the loop.

When the hook is in closed condition, as shown in FIG. 1, the end surface 25a of the plate 25 rests upon the upper edge of the end of section 21 of the hook member and the end of the tail 24 of the cam 23 lies in the path of swinging movement of the end of section 21 of the hook member toward open position and thus locks the hook against accidental opening. Under relatively light loads, the under surface of the lateral extension 22a of the section 22 of the hook member lies spaced from the curved surface 23a of the cam 23 but, under sufficient load, the hook member becomes distorted and the under surface of the lateral extension 22a bears against the curved surface.

When the hook member is in closed position, it cooperates with the frame plates to form an eye receiving the attaching link 29. The curved upper surface of the member defines the bottom of the eye and the lowest point on the surface lies between vertical lines through the axis of the pivot 15 and the abutment 14. Accordingly, when the load is raised, the link 29 takes a position in contact with the lowest part of the eye, so that the force applied to the hook by the load tends to maintain the hook in closed position. When the load is light, the load is transmitted from the hook member to the frame through the abutment 14 and the pivot 15 but, under a load sufficient to distort the hook member, the load is transmitted from the member to the frame through the abutment 14 and the pivot 13 and 15.

When the load is to be released, the loop 26 of the handle is pulled from beneath the end of the latch 28. Such movement of the handle causes the cam 23 to swing counter-clockwise and, if the lateral extension 22a of the section 22 of the member lies in contact with the cam surface 23a, the movement of the cam shifts the point of contact between the extension and the member, so that the lowest point of the bottom of the eye defined by the member moves to the side of a vertical line through the axis of the pivot 15 remote from the abutment 14. If the load is insufficient to distort the hook member to cause the extension to engage the curved surface of the cam, the movement of the member is effected by engagement of shoulder 23b on the cam with the end of the extension, as shown in FIG. 2. In either case, as soon as the lowest point of the eye passes beyond the axis of the pivot 15 in a direction away from the abutment 14, the load acts on the member to complete the opening movement of the member and the hook is completely released.

While the movement of the cam by the handle to release the hook member can ordinarily be effected by a movement of the handle in which the plate 25 of the handle moves away from the end of the short section 21 of the hook member, the handle may be swung for release of the hook member with the end surface 25a of the plate 25 bearing against the end of section 21 of the member serving as a fulcrum. In this action, only a small force need be applied to the handle to swing the cam to release the hook member.

The girth of the hook at the pivot 15, that is, the total measurement around the frame and the hook member in a plane passing through the axis of the pivot 15, is smaller than the comparable dimension of prior similar hooks. As a result, the hook can be used with smaller fittings than those required for the prior hooks.

We claim:

1. A releasable hook, which comprises a frame having attaching means at one end and an abutment between its ends, a generally U-shaped hooked member pivoted between its ends on the frame with the sections of the member at opposite sides of the pivot of unequal length, the hook member being movable in a vertical plane, when the hook is in normal use, between an open position, in which the ends of both sections of the hook member are free of the frame, and a closed position, in which both sections extend substantially vertically with the short section of the hook member resting on the abutment and the long section overlapping the frame, a cam pivoted on the frame and having a curved surface positioned to underlie a portion of the long section of the hook member when the hook member is in its closed position, the curved surface, at such time, being sufficiently close to the overlying portion of the hook member that when the hook is under sufficient load, it is engaged by the overlying portion and forms a bearing surface therefor, and handle means pivotally attached to the cam and movable to swing the cam to cause it to engage and swing the hook member towards open position, whereby the hook may be released under load.

2. A releasable hook as defined in claim 1, in which, in the closed position of the hook member, the hook member and frame form an eye defined at its lower end by a curved surface on the hook member, the curved surface of the hook member having its lowest point between the pivot of the hook member and said abutment.

3. A releasable hook as defined in claim 1, in which the cam has a shoulder lying at one end of its curved surface and engageable by the long section of the hook member.

4. A releasable hook as defined in claim 1, in which the cam has a tail lying in the path of movement of the short section of the hook member toward open position, when the hook member is in closed position, and preventing opening movement of said member.

5. A releasable hook as defined in claim 1, which includes a latch engageable with the handle to hold the handle with the cam in effective position with its curved surface beneath the long section of the hook member.

6. A releasable hook as defined in claim 1, in which the handle has a surface engageable with the short section of the hook member to hold that section against the abutment, when the hook member is in closed position and the handle is held by the latch.

References Cited in the file of this patent

UNITED STATES PATENTS

| | | |
|---|---|---|
| 855,368 | Watson | May 28, 1907 |
| 1,423,301 | Betcher | July 18, 1922 |
| 1,599,087 | Greve | Sept. 7, 1926 |
| 1,955,876 | Ferguson | Apr. 24, 1934 |
| 2,340,906 | Suarez | Feb. 8, 1944 |
| 2,559,999 | Regan et al. | July 10, 1951 |